(12) United States Patent
Schell et al.

(10) Patent No.: US 10,812,310 B1
(45) Date of Patent: Oct. 20, 2020

(54) METHOD AND APPARATUS FOR ADVANCED OFDM TRIGGERING TECHNIQUES

(71) Applicant: Sirius XM Radio Inc., New York, NY (US)

(72) Inventors: Edward Schell, Jackson, NJ (US); Carl Scarpa, Plainsboro, NJ (US)

(73) Assignee: Sirius XM Radio Inc., New York, NY (US)

( * ) Notice: Subject to any disclaimer, the term of this patent is extended or adjusted under 35 U.S.C. 154(b) by 0 days.

(21) Appl. No.: 16/655,859

(22) Filed: Oct. 17, 2019

(51) Int. Cl.
*H03D 1/00* (2006.01)
*H04L 27/06* (2006.01)
*H04L 27/26* (2006.01)
*H04B 7/185* (2006.01)

(52) U.S. Cl.
CPC ..... *H04L 27/2646* (2013.01); *H04B 7/18513* (2013.01); *H04L 27/2605* (2013.01)

(58) Field of Classification Search
CPC . H04L 27/2646; H04L 27/2605; H04L 27/02; H04L 25/068; H04L 27/2662; H04L 27/2678; H04B 7/18513; H03J 7/02
USPC ................................ 375/343, 362, 354, 369
See application file for complete search history.

(56) References Cited

U.S. PATENT DOCUMENTS

| 7,248,652 | B2* | 7/2007 | Sayeed | H04L 27/02 375/343 |
|---|---|---|---|---|
| 2006/0239179 | A1* | 10/2006 | Berkeman | H04L 27/2662 370/208 |
| 2007/0030797 | A1* | 2/2007 | Baek | H04L 27/2662 370/208 |
| 2008/0310527 | A1* | 12/2008 | Yuan | H04L 27/2678 375/260 |
| 2010/0158164 | A1* | 6/2010 | Oh | H04L 25/068 375/343 |
| 2011/0151817 | A1* | 6/2011 | Swarts | H03J 7/02 455/265 |

* cited by examiner

*Primary Examiner* — Phuong Phu
(74) *Attorney, Agent, or Firm* — Kramer Levin Naftalis & Frankel LLP (57) ABSTRACT

Systems and methods for a non-data-aided (NDA) approach to advanced OFDM timing are provided. This approach allows for accurate OFDM symbol timing and synchronization by avoiding inter-symbol interference (ISI) in multi-path environments where an earliest arriving signal may not be the strongest signal. The NDA approach may rely on generating and applying a bias correction to a combined correlation result of the multi-path signals.

20 Claims, 8 Drawing Sheets

METHOD AND APPARATUS FOR ADVANCED OFDM TRIGGERING TECHNIQUES

TECHNICAL FIELD

The present subject matter relates to signal modulation techniques including, advanced orthogonal frequency division multiplexing (OFDM) triggering techniques.

BACKGROUND

OFDM is a modulation technique widely used in systems where multi-path interference is a concern. Multi-path interference arises when multiple instances of the same signal arrive at different times at a receiver. This may occur more frequently in urban environments, for example, New York City, that include numerous tall buildings and other signal obstructions requiring a network of transmitters to ensure seamless coverage of an area. For example, in New York City, Sirius XM Radio Inc. deploys a network of terrestrial repeaters to supplement satellite signals to provide a seamless listening experience, without loss of signal, for subscribers driving through skyscraper-lined streets. This typically results in a mobile receiver receiving multiple instances of the same signal from several different paths, all at varying delays and power levels in such an environment. These multiple instances of the same signal may result in multi-path interference at the mobile receiver.

OFDM is designed to accommodate such multi-path interference by providing a Guard Interval (GI) in the modulation format of the transmitted signal. The GI is a cyclic prefix of time domain samples of an OFDM symbol. The duration of the GI may depend on a system design parameter chosen to accommodate a worst case multi-path delay. As an example, the Sirius XM satellite radio terrestrial networks may utilize GI durations of roughly 23 µs and 53 µs, depending on the network.

In theory, reflection delays that fall within the GI duration may be compensated for, but this may depend on several factors, including, for example, accurate timing and synchronization to the OFDM waveform. Some systems may employ special training sequences in time and/or frequency to properly synchronize to the transmitted waveform. Such algorithms may be classified as Data-Aided (DA) synchronization routines. The DA synchronization routines may come at the expense of system throughput and complexity because such systems may need to generate and detect the special training sequences, and these sequences may occupy bandwidth that could otherwise be used to transmit useful data. Alternatively, systems that do not have special training sequences may rely on Non-Data-Aided (NDA) routines or algorithms. Such NDA routines or algorithms do not require special training sequences and no overhead may be required to generate, transmit, and process these sequences. However, without the special training sequences, accurate triggering and synchronization may be more challenging, particularly in noisy environments. Therefore, there is a need for improved triggering and synchronization accuracy of systems that use NDA synchronization routines or algorithms.

To address such needs, the present invention is directed to methods and systems that may provide improved timing references, accurate trigger control, and synchronization of modulated data signals transmitted over communication networks. For example, the present invention provides methods and systems that utilize improved NDA techniques to enhance triggering and synchronization accuracies, with or without a need for the special training sequences.

SUMMARY

Example embodiments of the present invention enable a receiver to receive a plurality of multi-path signals that correspond to a same signal delayed by different amounts during transmission, calculate a combined correlation result for the multi-path signals, and apply a bias correction over a range of data samples of the correlation result to identify an accurate triggering reference for an OFDM symbol.

The details of one or more implementations are set forth in the accompanying drawings and the description below. Other features and advantages will be apparent from the description and drawings.

BRIEF DESCRIPTION OF THE DRAWINGS

For a more complete understanding of the inventive embodiments, reference is made to the following description taken in connection with the accompanying drawings in which.

DETAILED DESCRIPTION

The present subject matter is directed to methods and systems that may provide improved timing references, accurate trigger control and synchronization of multi-path data signals that are subject to multi-path interference. The present subject matter provides, among other features, a technique to produce accurate timing under many circumstances, including those illustrated in the examples herein. In some embodiments, the technique to produce accurate timing includes applying a bias correction to a correlation result of the multi-path signals that will discriminate against longer signal paths and favor shorter signal paths. According to various embodiments, the bias correction may be a programmable predetermined metric.

Figure 1:
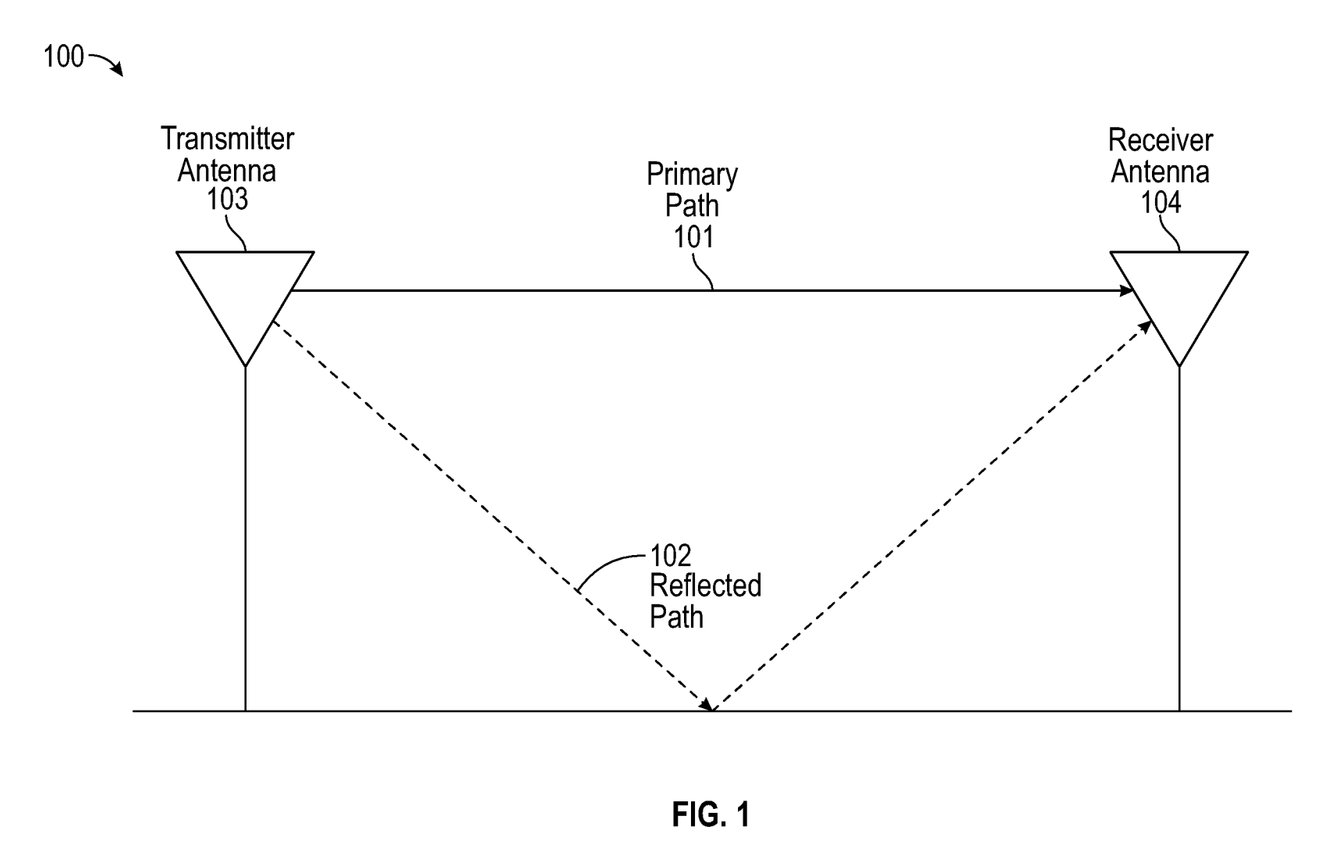
FIG. 1 is an illustration of an example of multi-path interference.

FIG. 1 illustrates an example of two instances of the same signal arriving at a receiver antenna. A transmitter antenna 103 sends a signal that is received by the receiver antenna via two different paths. A first path is a primary path 101 that may include a direct line-of-sight to the receiver, while a second path may include a reflected path 102 off, for example, a nearby structure (e.g., building or house). Because the second path corresponds to a longer distance, the signal travelling via the reflected path 102 may be delayed and may arrive at a later time than the signal travelling via primary path 101. The second path may result in the signal associated with the second path having a lower power level than the signal received via the primary path.

Figure 2:
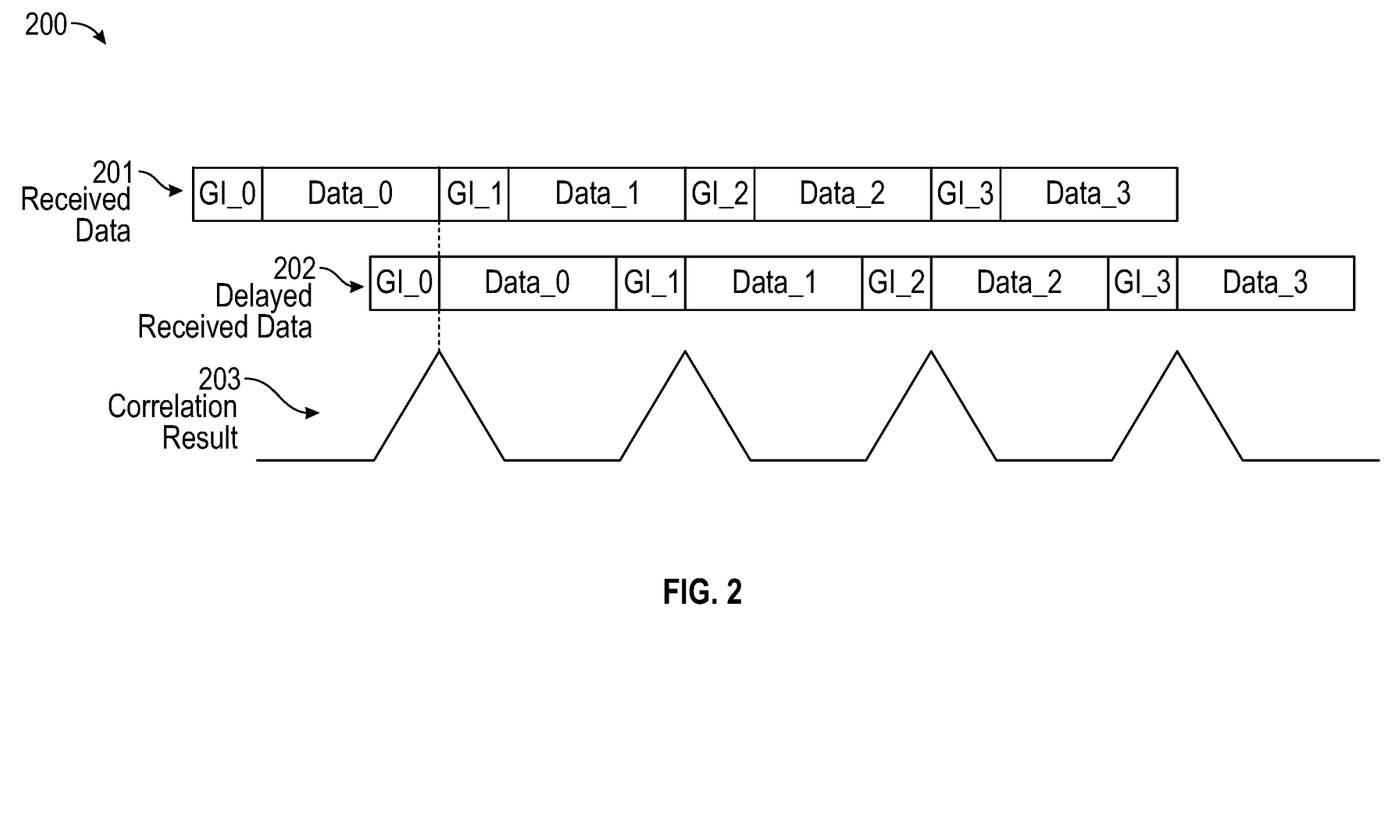
FIG. 2 is an illustration of a correlation example.

FIG. 2 shows an example of a NDA technique for timing recovery of an OFDM symbol, which includes performing a simple correlation of the signal 201 with a delayed copy 202 of itself. The delay is approximately equal to a length of the original OFDM symbol without GI insertion. A correlation size may approximately equal a length of the GI. In some embodiments, a start of the OFDM symbol may be based on autocorrelation of the signal 201 with the GI. A value of the correlation result 203 may peak around the end of a data sample (e.g., DATA_0) of the original symbol, which is also aligned with an end of a previous GI (e.g., GI_0) of the delayed signal, because the GI may be a predefined cyclic prefix of the original OFDM symbol. Detection of such correlation peaks may be used to create a timing reference for triggering the start of an OFDM symbol (e.g., DATA_0, DATA_1, DATA_2, etc.). In an OFDM receiver, the timing reference is used to control which set of data samples is loaded into a Fast Fourier Transform (FFT) for further processing.

Multi-path interference may be much more complicated than the examples illustrated in FIGS. 1 and 2. Consequently, the correlation results associated with autocorrelation or cross-correlation of the GI with multi-path signals of the conventional technique discussed above may not always produce well-defined correlation peaks. Instead, the correlation results may typically be an aggregate of multiple correlation results respectively arising from one signal of the multiple delayed copies of the same signal received via different signal paths.

Figure 3:
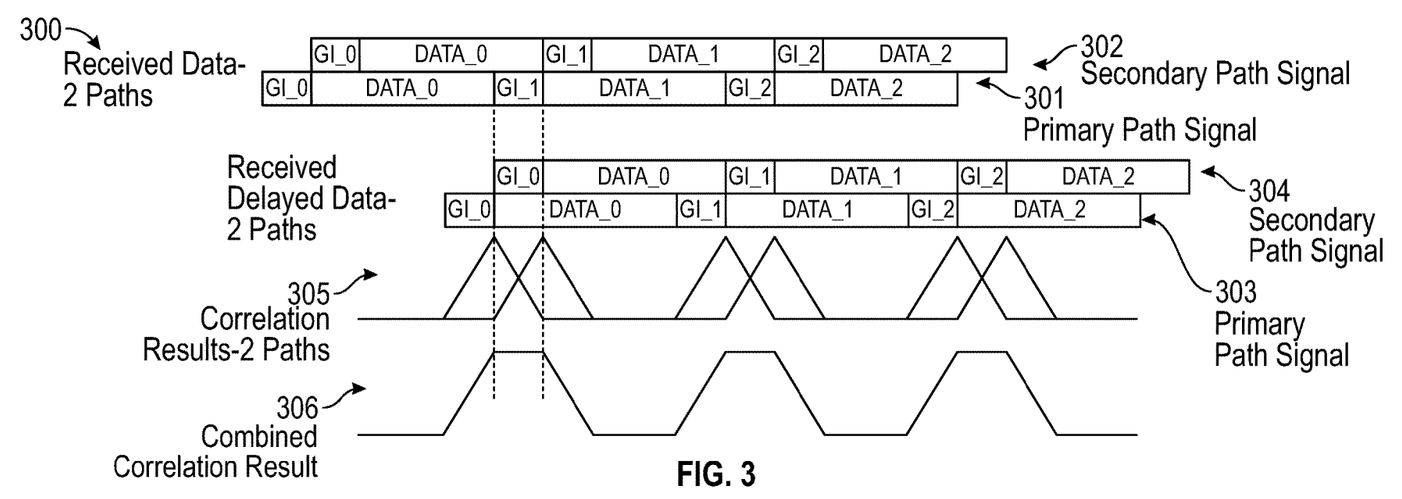
FIG. 3 is an illustration of an exemplary two-path signal.

FIG. 3 shows an example of the more complex multi-path interference that includes reception of a same signal via two different paths, resulting in two received multi-path signals, each of relatively equal power with a relative delay equal to a GI duration. As may be seen in FIG. 3, a combined correlation result 306, associated with individual correlation contributions 305 for each multi-path signal, may give rise to a rising edge leading to a flat top. Consequently, no discernible peak may be available to be chosen as a timing reference and/or for symbol alignment for synchronization of the multiple delayed path signals 303 and 304. Instead, the combined correlation result 306 may include a combination of two correlation peaks that respectively correspond to the two delayed signals 303 and 304 received via the two different paths. The combined correlation result may be based on an autocorrelation of the combined multi-path signals with the predefined GI.

Figure 4:
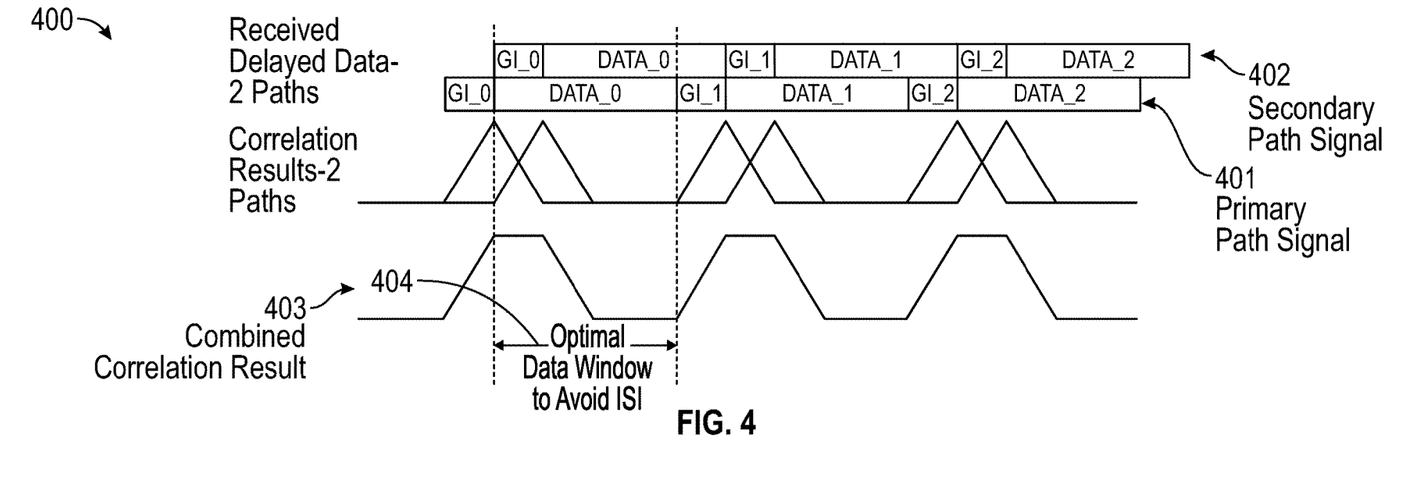
FIG. 4 is an illustration of another exemplary two-path signal.

Accurate timing and symbol triggering may help avoid Inter-Symbol Interference (ISI), ensuring that data samples from the combined multiple paths contain samples associated with the same original transmitted OFDM symbol over a specified data window. FIG. 4 illustrates an example of an optimal data window 404 to avoid ISI. The optimal data window may range anywhere from a time at which an earliest correlation peak may have occurred (e.g., GI_0) up to a start of a next correlation peak that may correspond to a next GI (e.g., GI_1) for the primary path signal with no other multi-path signal present. The earliest correlation peak may occur at a start of the delayed GI (e.g., start of GI_0) associated with the delayed path signal (e.g., secondary path signal 402).

In general, accurate timing and symbol triggering may be ensured by detecting the earliest arriving signal that may correspond to a shortest path. As shown in FIGS. 3 and 4, when there is no discernible combined correlation peak and/or when correlation results provide multiple overlapping peaks a more advanced approach for timing and symbol triggering may be needed to identify a start of a next GI or data symbol.

Figure 5:
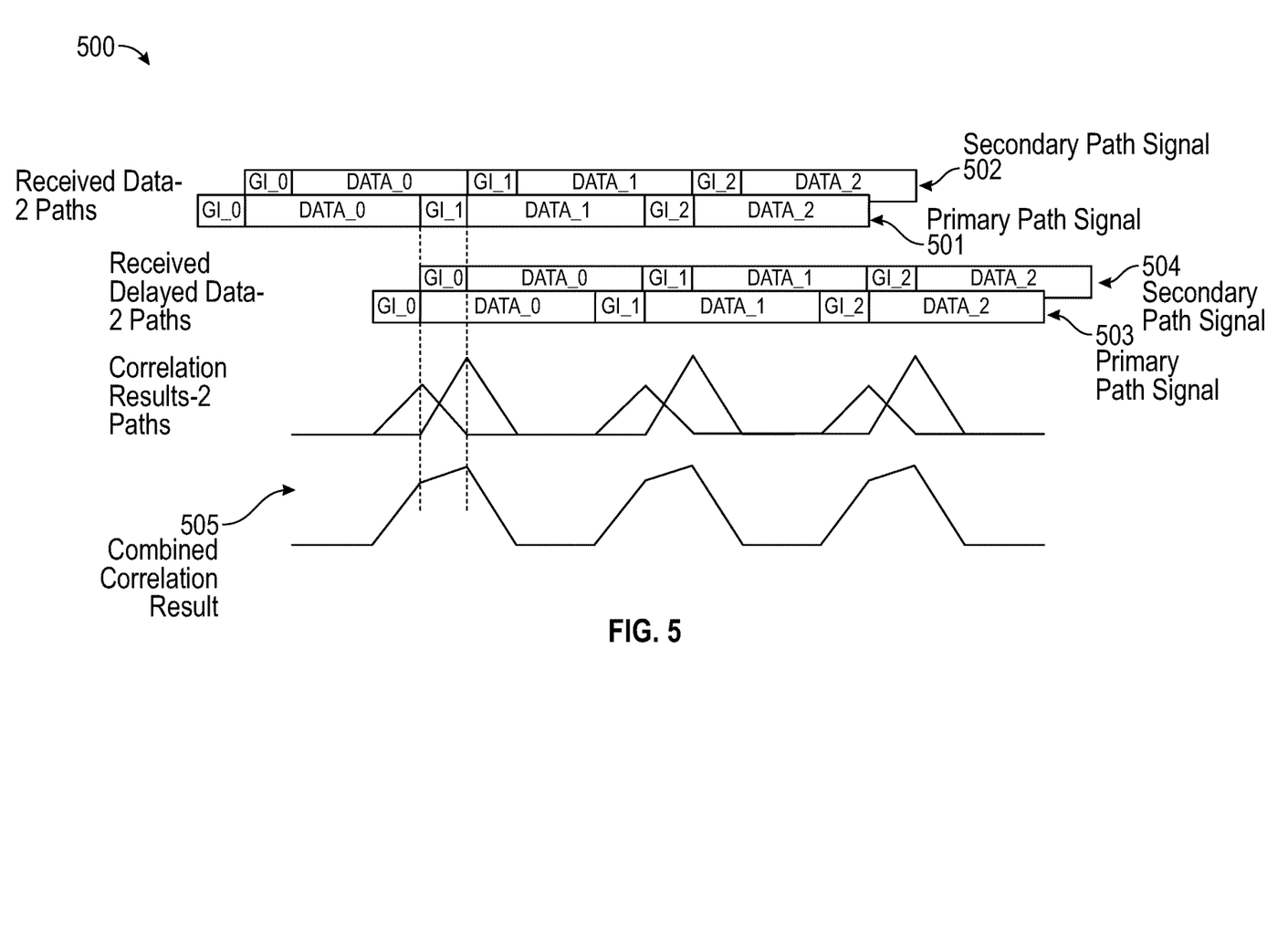
FIG. 5 is an illustration of yet another exemplary two-path signal.

FIG. 5 illustrates an even more complex example, wherein an earliest arriving signal (e.g., primary path signal 503) results in a weaker correlation peak than correlation peaks corresponding to delayed multi-path signals (e.g., secondary path signal 504) arriving later. This may be attributed to the earliest arriving signal being lower in power than the secondary-path signal that arrives later with a separation time window corresponding to approximately one GI length. As may be seen in FIG. 5, as the power of the earliest arriving-path signal gets lower, it may have less of an impact on the combined correlation result 505. For the two paths shown in FIG. 5, the resulting combined correlation 505 may eventually devolve back to that of FIG. 1, where there is a single discernible peak. In such a scenario, one way, for example, to synchronize the OFDM data is to generate a trigger signal corresponding to the earliest arriving-path signal within the GI, but detection of the earliest arriving-path signal becomes increasingly difficult as the power of the signal is reduced. Therefore, in some embodiments, the invention may determine sufficient power levels for generating the trigger signal for the earliest arriving-path signal, which may be lower in power than the dominant- and/or primary-path signal.

Figure 6:
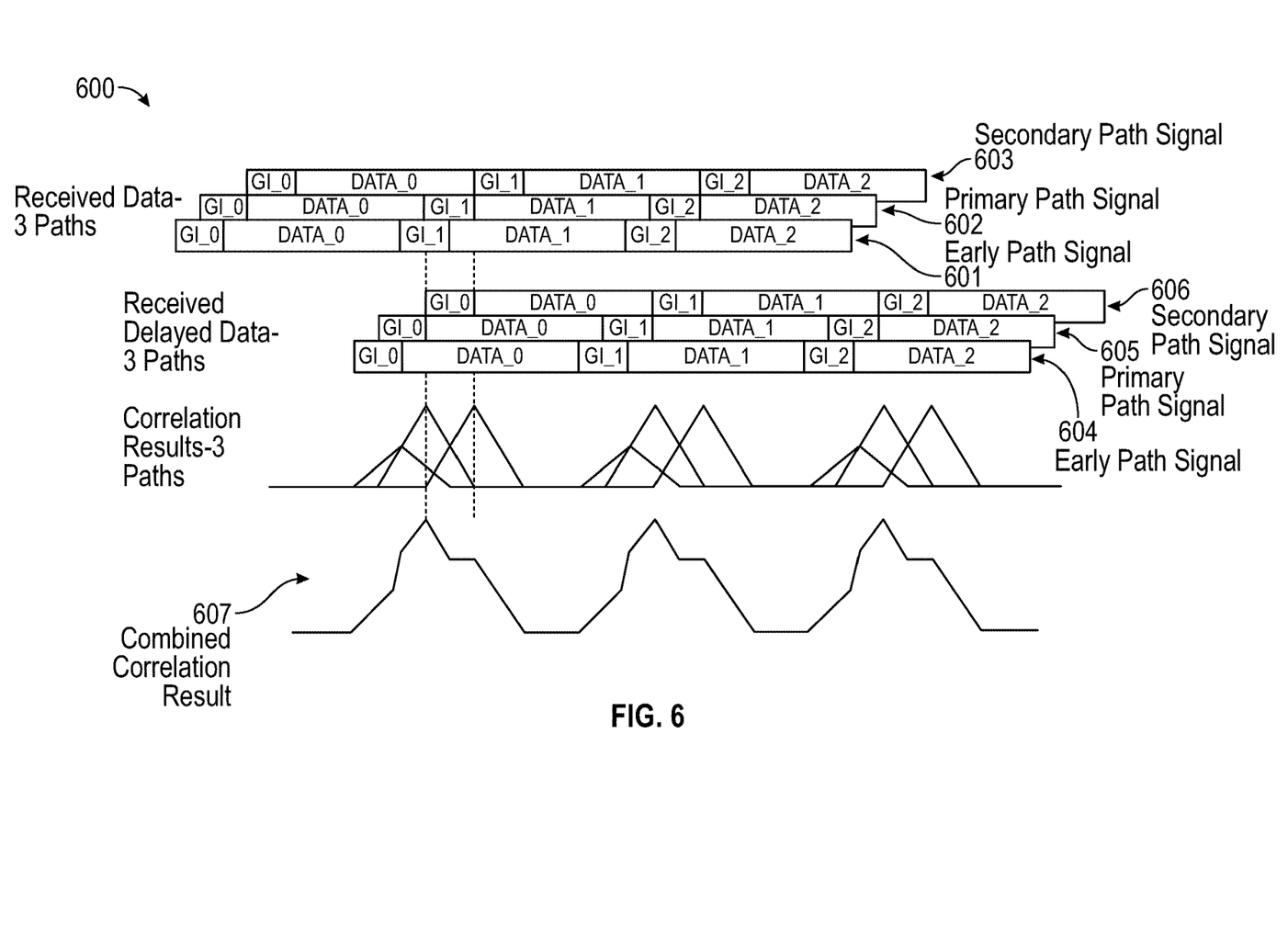
FIG. 6 is an illustration of an exemplary three-path signal.

In cases where delay spread is greater than the GI length, the earliest arriving-path signal may not provide optimal timing and may lead to a degradation in performance. The delay spread may correspond to a net delay in arrival times of data carried by the earliest arriving signal and a latest signal of the multi-path signals. Consider, for example, FIG. 6, that shows three multi-path signals including the Primary-Path Signal 605 and the Secondary-Path Signal 606 of equal power separated by the GI length (e.g., GI_0), and an earlier arriving signal (Early-Path Signal 604) of lesser power preceding the primary-path signal 605 and the Secondary-Path Signal 606. Because the delay spread between the Early-Path Signal 604 and the latest arriving Secondary-Path Signal 606 is greater than the length of the GI, timing based-off of the Early-Path Signal 604 will result in ISI from the higher-power and later-arriving Secondary-Path Signal 606. In this scenario, the present subject matter may, in some embodiments, produce timing and/or triggering with respect to the second-path signal (e.g., Secondary-Path Signal 606). Although timing and/or triggering based on the second-path signal may still result in ISI, such interference would arise from the much lesser power of the earliest arriving-path signal 604. FIG. 6 illustrates an example of the combined correlation result 607 this scenario would produce.

The combined correlation result, such as 607, may be used to identify an accurate correlation peak that provides the correct timing and/or triggering for multi-path OFDM signals based on standard peak detection techniques. It is desirable to provide advanced timing and/or triggering techniques that do not indiscriminately choose the earliest-path signal, but may choose one of the multi-path signals based on delay times associated with each of the multi-path signals and based on corresponding power levels of each of the multi-path signals that may be detected.

Figure 7:
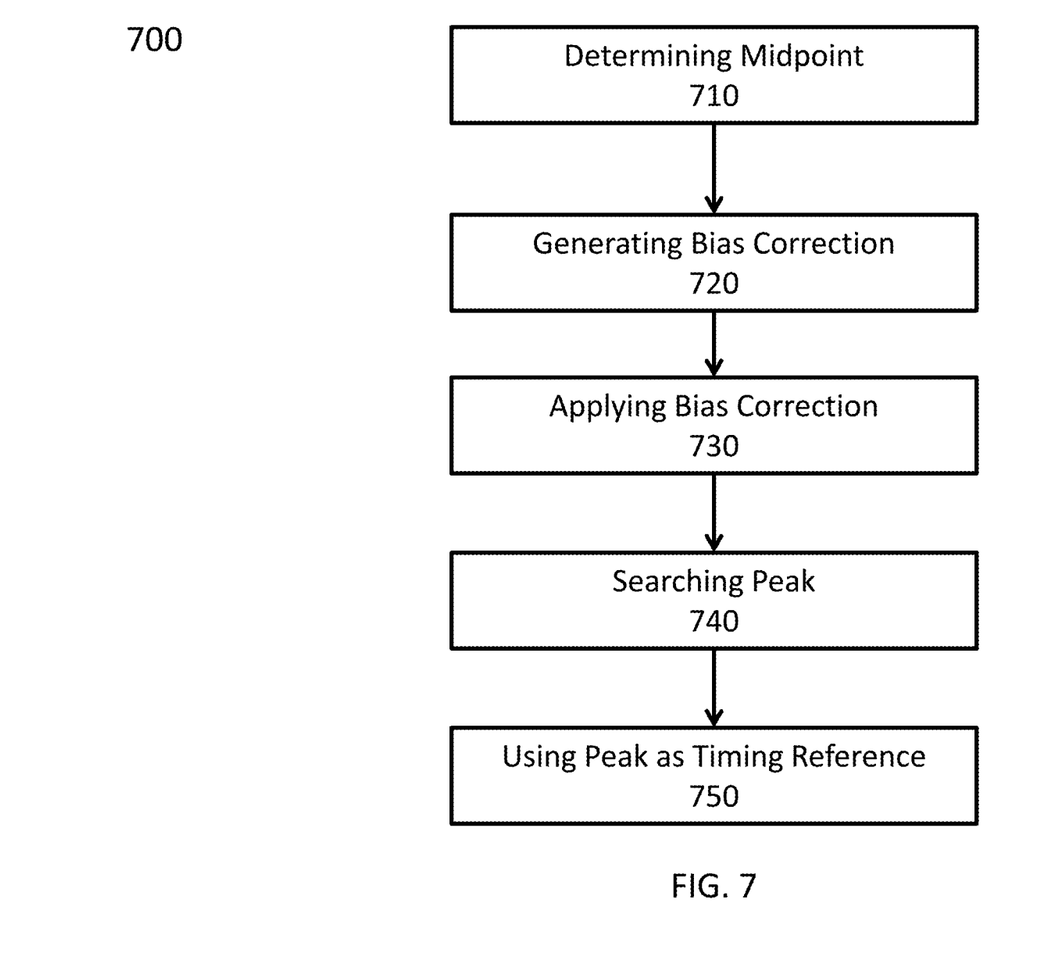
FIG. 7 is an illustration of an application of an exemplary embodiment of the present subject matter.

References will now be made to FIG. 7, which illustrates a process flow diagram of an exemplary method 700 in accordance with some embodiments of the present subject matter. Here, a device implementing this exemplary process (e.g., a receiver) receives a signal (e.g., at an antenna) via a plurality of signal paths, wherein each of the plurality of signal paths provide a copy of the same signal, offset in time.

The device aggregates these copies into a single received signal. The device performs the aforementioned conventional correlation on the received signal to obtain a combined correlation result as illustrated in FIGS. 3-6 and outlined in the corresponding description. The combined correlation result may undergo additional conditioning at this point, such as averaging over multiple OFDM symbol durations.

At 710, the device/process determines a midpoint, which may be a location between the points (e.g., halfway), where the correlation result satisfies a predetermined threshold in the positive and/or negative directions. Choices of an appropriate correlation threshold and a technique to calculate a final midpoint may be achieved in a number of ways. As an example, one approach may include determining a correlation threshold which is equivalent to half of the difference between the minimum and maximum value of the correlation result over a pre-defined window duration that may be equal to the full length of the OFDM symbol (e.g., data symbol duration+GI). As another example, the final midpoint may be based on a predefined range of correlation values.

At 720, the process may generate a bias correction that may be approximately centered on the midpoint. The bias correction may be, in some embodiments, increasingly positive to the left of the midpoint, and increasingly negative to the right of the midpoint, so as to favor earlier arriving multi-path signals and disfavor later arriving multi-path signals.

In some embodiments, the bias correction may have a length and/or shape that is selected based on desired characteristics. For example, the length may be fixed or programmable, and its value may depend on, for example, how much of the correlation result one wishes to influence.

For example, in some embodiments, the bias correction may increase a likelihood of the combined correlation peak arising within the GI. The bias correction may be applied over a time window that covers data points of the combined correlation results over a predetermined duration of time. For example, the time window may extend approximately one GI in either direction from the midpoint for a total duration spanning two GIs.

In some situations, application of the bias correction over the full GI may not be of use because the system may not be capable of supporting delays over the full length of the GI. For example, a system such as a legacy version of the Sirius XM satellite broadcast system may have a GI of approximately 53 μs, and the system may fail at midpoint delays beyond approximately 40 μs. Therefore, the targeted bias correction window may be shortened to ignore midpoint delays beyond a particular delay threshold. Additionally, if the linear bias correction is not sufficiently favoring earlier correlation peaks enough, or not disfavoring later correlation peaks, the linear bias may be replaced with a non-linear function, such as one related to an exponential or tangent function.

In some embodiments, the shape of the bias correction may be derived from a linear or non-linear formula, and may also be programmable. One exemplary approach is to create a linear correction with a programmable slope. The linear bias correction may have, for example, a negative slope and have a value of zero at the midpoint.

As an example, the process may generate a linear correction with a programmable slope. The correction may have a negative slope and have a zero value at the midpoint. The following equation is an example of how to generate the bias correction, where mp is the midpoint, bias_slope is a positive programmable slope value, pos is the current position within the size of the OFDM symbol (data+GI), and ws/we represent the start and end point of the vector with respect to the midpoint respectively.

$$\text{bias}_{correction} = \text{bias}_{slope} * (mp - pos), pos \in [(mp - ws), (mp + we)]$$

At 730, the process may apply the bias correction generated. For example, the process may add the generated bias correction to the original combined correlation result to generate a biased correlation result.

At 740, the process searches the generated biased correlation result for a peak. In some embodiments, this may include, for example, searching for the first occurring maximum peak value. As another example, a cluster of local peak values, rather than a single maximum peak value, may be identified. Once the peak and/or local cluster of peak values is selected, the process may use the location of the peak and/or local cluster of peak values to generate the timing and/or trigger reference for the current OFDM symbol (at 750).

While in some embodiments these peak locations are uniquely computed for each correlation result, simplifications may be made to avoid additional memory required to delay the data path further. For example, the midpoint value of the previous correlation result may be used to generate the bias correction for the current correlation sum. Assuming the channel conditions are not changing significantly from one OFDM symbol to the next, the timing reference created from the biased correlation result may be applied to the following symbol, making additional processing savings.

Figure 8:
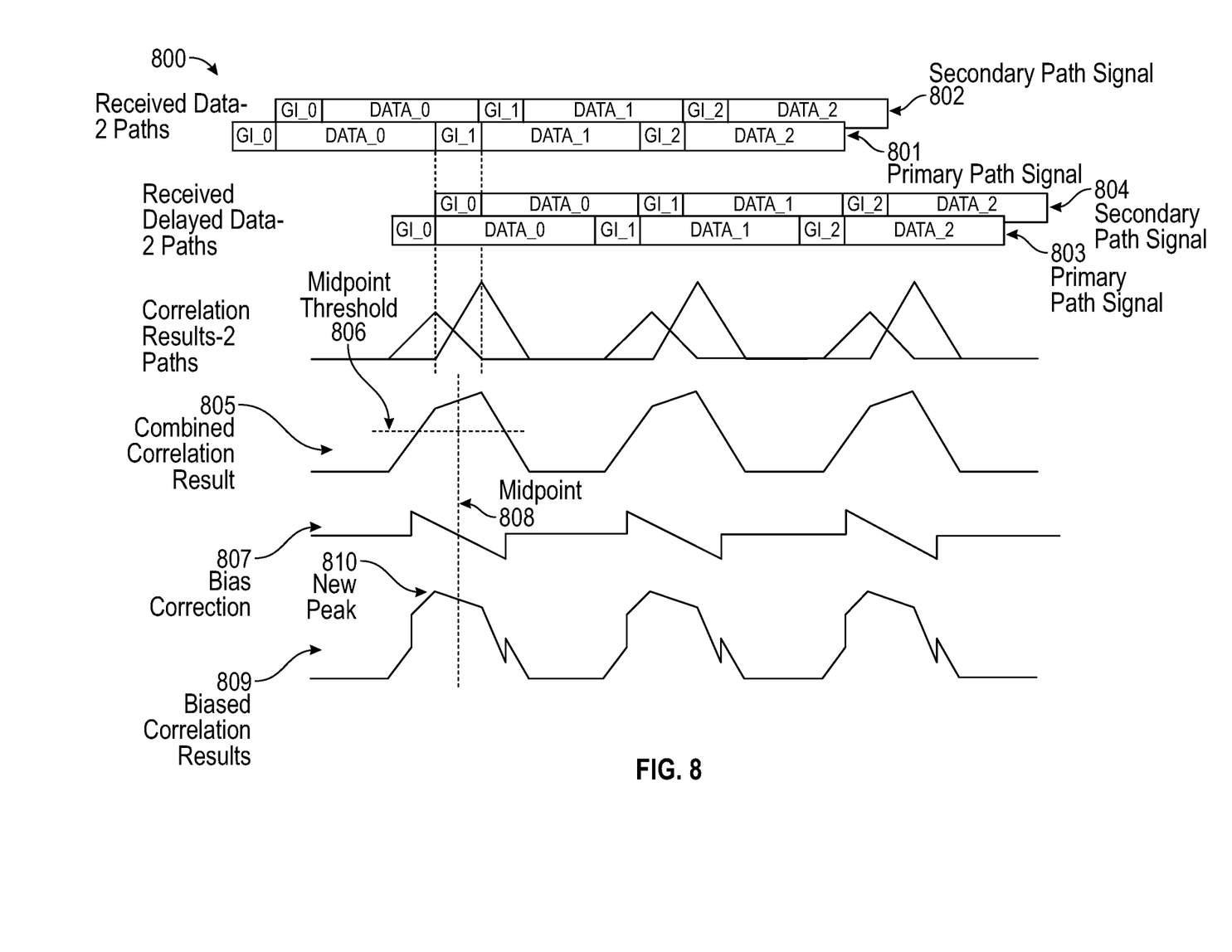
FIG. 8 is an illustration of another application of an exemplary embodiment of the present subject matter.

FIG. 8 illustrates an application of the bias correction of the present subject matter. In this example, the bias correction 807 is represented by a line having a constant slope. The magnitude of the slope may determine how much emphasis is given to early arriving signal paths, such as primary path signal 803. The magnitude of the bias must be large enough to elevate the peaks of early arriving peaks within some defined power range of the delayed signal arriving via a longer path (e.g., secondary path signal 804), but not so large as to create false peaks. On the other hand, the bias magnitude should also provide enough de-emphasis on the delayed path-signals arriving via the longer paths to avoid choosing a peak that will lead to ISI.

Referring back to FIG. 6, in cases where the delay spread is greater than the GI, detecting the earliest peak may not be optimal. In this scenario, application of the bias correction may avoid emphasizing the earliest peak. This may be controlled in a number of ways by the present subject matter. For example, the range of samples over which the bias correction is applied may be selected based on a predefined value relative to the size of the GI, respective signal power levels of the multi-path signals and/or occurrences of peaks in the combined correlation results.

In some embodiments, the predefined value may be limited to the size of the GI. In some embodiments, the predefined value may be greater than the size of the GI. In some embodiments, this range may be applied with respect to the midpoint selection. Therefore, the method for selecting the midpoint may also be adjusted, for example, based on the size of the GI and/or peaks in the correlation results, in some embodiments.

Another control provided by the present subject matter is a magnitude of the bias correction. In the example in FIG. 8, a fixed slope is utilized, which may also be adjusted, in some embodiments, to reach the desired results. For example, the magnitude of bias correction applied may be changed by changing the value of the slope. Forward bias correction or reverse bias correction may be applied depending upon the sign of the slope, such as positive or negative.

Figure 9:
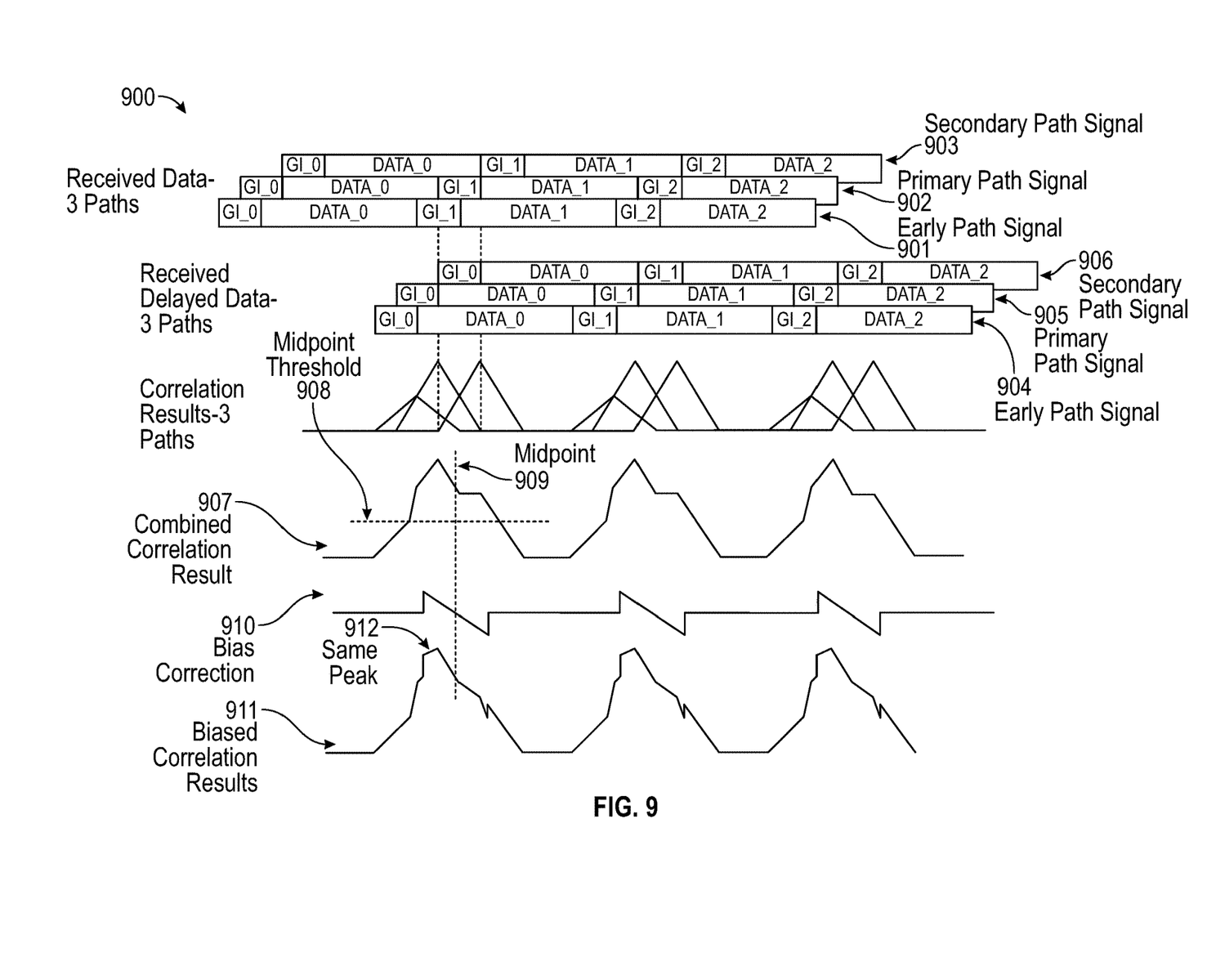
FIG. 9 is a process flow diagram of an exemplary embodiment of the present subject matter.

FIG. 9 illustrates an application of a linear bias correction provided by the present subject matter that does not result in accurate triggering. This illustration demonstrates how a linear bias correction, similar to that utilized in FIG. 8 to accurately bias the earliest arriving multi-path signal, may not work for an early arriving multi-path signal of lower power arriving before a start of the GI of the primary multi-path signal. FIG. 9 shows three multi-path signals (904, 905 and 906) received at a receiver that have each been delayed a different amount in time. The FIG. 9 then illustrates correlation results respectively corresponding to each of the three multi-path signals and a combined correlation result 907 for all three-multi-path signals. As can be seen from FIG. 9, application of a linear bias correction 910 does not shift the correlation peak. Instead, the peak for the biased correlation results 911 coincides with that of the peak for combined correlation results 907. This may result in timing and synchronization inaccuracies because the system fails to set an accurate trigger point that corresponds to the correlation peak for the early path signal 904 and instead identifies a trigger point that coincides with the correlation peak for the primary path signal 905. In such situations, another exemplary approach provided by the present subject matter would be to use a non-linear method to determine the bias correction, which would give better control of the magnitude of the bias over a chosen range of samples.

The specific selection of design parameters to generate and apply the bias correction may depend on the specific performance constraints of a particular system. In some embodiments, these design parameters may be fixed for the design, or in some embodiments, dynamically changed based on other available information about the transmission channel. For example, Channel State Information (CSI) may be used to dynamically control an expected range of signal delays being considered to avoid false peaks and achieve better performance. In some embodiments, the CSI may be determined from DA synchronization approaches and/or metadata associated with signal.

The invention claimed is:

1. A method for advanced wireless multi-path signal triggering, the method comprising:
   receiving, by at least one data processor, a plurality of multi-path signals that correspond to a same signal delayed by different amounts during transmission over a plurality of wireless data paths;
   generating, by the at least one data processor, a correlation result associated with the plurality of multi-path signals based on correlating the received signal of the plurality of multi-path signals with a predefined guard interval;
   determining, by the at least one data processor, a correlation midpoint associated with the correlation result;
   applying, by the at least one data processor, a bias correction over a range of data samples of the correlation result that are centered around the correlation midpoint;
   generating, by the at least one data processor, a biased correlation result responsive to the applied bias correction;
   identifying, by the at least one data processor, a peak of the biased correlation result; and
   using, by the at least one data processor, the peak of the biased correlation result as a triggering reference for a current data symbol of the received signal.

2. The method of claim 1, wherein the at least one data processor receives at least one of the plurality of multi-path signals via a wireless satellite broadcast.

3. The method of claim 1, wherein the correlation midpoint is determined based on:
   identifying a set of values of the correlation result that satisfy a predetermined correlation threshold.

4. The method of claim 3, wherein the predetermined correlation threshold is based on the correlation result.

5. The method of claim 4, wherein the predetermined threshold is further based on:
   determining an approximate minimum value and an approximate maximum value of the correlation result over a pre-defined window; and
   setting the predetermined threshold to be approximately equal to half of a difference in value between the minimum value and the maximum value.

6. The method of claim 3, wherein the generating the bias correction is further based on:
   determining an expected delay range associated with the plurality of multi-path signals; and
   selecting a subset of the correlation result that corresponds to the expected delay range.

7. The method of claim 3, wherein the generating the bias correction is based on using a linear formula.

8. The method of claim 3, wherein the generating the bias correction is based on using a non-linear formula.

9. The method of claim 1, wherein the range of data samples are determined based on determining respective signal power levels associated with each of the plurality of multi-path signals.

10. A method for advanced orthogonal frequency division multiplexing (OFDM) timing, the method comprising:
    receiving, by at least one data processor, a plurality of multi-path signals that correspond to a same signal delayed by different amounts during transmission over a plurality of wireless data paths;
    combining, by the at least one data processor, the plurality of multi-path signals into a combined signal;
    generating, by the at least one data processor, a combined correlation result for the combined signal based on a predefined guard interval;
    selecting, by the at least one data processor, a range of data samples associated with the combined correlation result based on a duration of the guard interval;
    applying, by the at least one data processor, a bias correction over the range of data samples;
    generating, by the at least one data processor, a biased correlation result responsive to the applied bias correction; and
    using, by the at least one data processor, a peak of the biased correlation result as a timing reference for a current OFDM symbol.

11. The method of claim 10, wherein the selecting the range of data samples is further based on determining respective signal power levels associated with each of the multi-path signals.

12. The method of claim 10, wherein the selecting the range of data samples is further based on a predefined value relative to a size of the guard interval.

13. The method of claim 10, wherein the applying the bias correction is further based on:
    determining an expected delay range associated with data arriving via the plurality of multi-path signals; and
    using a subset of the combined correlation result that corresponds to the expected delay range.

14. The method of claim 10, wherein the bias correction is based on using a linear formula.

15. The method of claim 10, wherein the bias correction is based on using a non-linear formula.

16. The method of claim 10, wherein the bias correction is based on:
    determining an expected delay range associated with the multi-path signals; and
    using a subset of the combined correlation result that corresponds to the expected delay range.

17. The method of claim 16, wherein the determining the expected delay range is based on using channel state information for dynamically controlling an expected range of signal delays.

18. A system comprising:
    an orthogonal frequency division multiplexing (OFDM) receiver module comprising an antenna; and
    at least one computing device, wherein the at least one computing device comprises:
    at least one processor;
    memory storing computer-readable instructions that, when executed by the at least one processor, cause the computing device to:
        receive, from the OFDM receiver module, a plurality of multi-path signals that correspond to a same signal delayed by different amounts during transmission over a plurality of wireless data paths;
        generate a combined correlation result based on correlating an aggregated signal of the plurality of multi-path signals with a predefined guard interval;
        select a range of data samples associated with the combined correlation result based on occurrences of the correlation peaks;
        apply a bias correction over the range of data samples;
        generate a biased correlation result responsive to the applied bias correction; and
        use a peak of the biased correlation result as a timing reference for a current OFDM symbol.

19. The system of claim 18, the memory further storing computer-readable instructions that, when executed by the at least one processor, cause the computing device to:
    select the range of data samples is based on determining respective signal power levels associated with each of the plurality of path-signals and a predefined value relative to a size of the guard interval.

20. The system of claim 18, wherein the bias correction is based on using a linear or non-linear formula.

* * * * *